(12) United States Patent
Lin

(10) Patent No.: US 6,415,812 B1
(45) Date of Patent: Jul. 9, 2002

(54) CONTROL EQUIPMENT FOR KEEPING LIGHT OIL VAPOR AT STABLE PRESSURE AND CONSTANT TEMPERATURE

(76) Inventor: Jui Fu Lin, 5F, No. 23, Lane 9, Alley 73, Sec. 3, Ching Chen Rd., Tu-Chen City, Taipei Hsien (TW)

( * ) Notice: Subject to any disclaimer, the term of this patent is extended or adjusted under 35 U.S.C. 154(b) by 15 days.

(21) Appl. No.: 09/716,298

(22) Filed: Nov. 21, 2000

(51) Int. Cl.7 ............... F24H 1/18; F22B 1/28
(52) U.S. Cl. .......... 137/341; 137/382; 137/558; 137/592; 392/394; 392/401
(58) Field of Search ............... 137/341, 377, 137/382, 592, 401, 400, 558; 392/391, 394, 396

(56) References Cited

U.S. PATENT DOCUMENTS

| | | | | |
|---|---|---|---|---|
| 1,756,053 A | * | 4/1930 | Colton ............... | 422/106 |
| 1,959,031 A | * | 5/1934 | Masters ............. | 392/394 |
| 2,158,458 A | * | 5/1939 | Mathis .............. | 392/403 |
| 4,219,725 A | * | 8/1980 | Groninger .......... | 137/341 |
| 4,255,646 A | * | 3/1981 | Dragoy et al. ..... | 392/396 |

* cited by examiner

Primary Examiner—A. Michael Chambers
(74) Attorney, Agent, or Firm—Rosenberg, Klein & Lee

(57) ABSTRACT

The invention relates to a control equipment for keeping light oil vapor at stable pressure and constant temperature, it mainly supply a device for keeping temperature constant and pressure stable so as to stay the light oil in a steel bottle at a fixed saturated vapor pressure and not to let the saturated vapor pressure of the light oil be influenced by an outside temperature of background; it's structure comprises: a pressure stabilizing device, which can adjust the saturated vapor pressure of the oil vapor in a light oil tank, is utilized to control air pumping by a pressure switch and a resistor air motor, wherein a check valve therein prevents air from flowing back, a hollow pressure stabilizing tube at it's upper side is utilized to buffer air and then carry it into the light oil so as to reach the purpose of pressure stabilization; a constant temperature maintaining device, which keeps temperature constant by a temperature-controlled relay, when temperature is too high, the temperature-controlled relay is open, ordinarily, constant temperature is kept incessantly by a soft resistance wire, the outer surface is covered by thermostatic cotton to prevent heat loss so that a stable combination proportion is maintained and insufficient or excessive oil vapor will be not yielded.

8 Claims, 4 Drawing Sheets

CONTROL EQUIPMENT FOR KEEPING LIGHT OIL VAPOR AT STABLE PRESSURE AND CONSTANT TEMPERATURE

TECHNICAL FIELD

The present invention relates to a control equipment for keeping light oil vapor at stable pressure and constant temperature, more particularly to a device for keeping pressure stable and temperature constant so that light oil vapor in a steel bottle can be stayed at a fixed saturated vapor pressure and vaporization of the light oil can be kept at a constant rate to avoid the influence of surrounding temperature so that a stable combination proportion is maintained and insufficient or excessive oil vapor will be not happened.

BACKGROUND OF THE INVENTION

A current structure of a light oil steel bottle mainly is that an inhale opening and an exhale opening are installed in the steel bottle, and a air pump is disposed at the inhale opening so as to input air through the inhale opening into the light oil in the steel bottle thereby to increase the contact between the light oil and air to generate a saturated vapor pressure, and then output the oil vapor through the exhale opening for future use, such as the structure described in Taiwan Pat. No. 325856, in this patent, FIG. 1 shows a conventional structure of a light oil steel bottle, it comprises a bottle body 10 for packing light oil therein; an oil input opening 102 for filling in light oil through it, a cover body 1024 and a washer 1022 for preventing oil vapor from leaking out; a rotating switch 16 and an exhale opening 162 utilized for users to output the oil vapor; an inhale device 12, an inhale nozzle 122, an inhale tube 124 and a plurality of air holes 126 for inputting air into the oil vapor to generate oil vapor pressure; it can't be counted as a bad idea, but as the invention described, the air delivering device will not be opened to deliver air until it is used, obviously if is not an ideal way, because the needed fire power output is variable and not fixed, so if the air delivering device only offer a fixed air supply is used, it will cause the generated fire power to be not enough or the pressure to be too large.

The way that the oil is generated by utilizing an air pump is always influenced by outside temperature, it is also the biggest problem on using light oil, the higher is the outside temperature, the quicker is the vaporization speed of the oil, in the meantime, the temperature of the air inhaled by the air delivering device is higher, oil-air combination proportion gets higher consequently; the lower is the outside temperature, the slower is the evaporation speed of the oil, and the temperature of the air inhaled by the air delivering device is also lower, it will cause the oil vapor to be insufficient, and even more, to be unable to be burnt. For the reason that climate is an uncontrollable factor, and the change of temperature has a great influence on the evaporation characteristics of the light oil, so that the development space in a such kind of product is limited.

The conventional light oil vapor supplying device is not able to solve the influence of the saturated vapor by outside environment, the inhalation of air only increase a little effect thereon, it brings only a temporary solution, such kind of the light oil vapor supplying device still can not be broadly used.

Therefore, how to resolve the problem occurred from the conventional device is a longtime expectation for the person of the art.

SUMMARY OF THE INVENTION

One object of the present invention is to remedy this disadvantage. For this purpose, the present invention provides a control equipment for keeping light oil vapor at stable pressure and constant temperature, supplying a constant temperature device so as to reach the effect that the outside environment doesn't influence the evaporation speed of the light oil.

Another object of the present invention is to provide a control equipment for keeping light oil vapor at stable pressure and constant temperature, supplying a pressure stabilizing device, so as to reach the effect that the saturated vapor pressure of the light oil can be adjusted automatically.

Another object of the present invention is to provide a control equipment for keeping light oil vapor at stable pressure and constant temperature, supplying a pressure stabilizing tube to buffer the air input into the light oil.

Another object of the present invention is to provide a control equipment for keeping light oil vapor at stable pressure and constant temperature, supplying a temperature controlling relay so as to prevent the temperature from being too high and reach the goal of safety.

DETAILED DESCRIPTION OF THE PREFERRED EMBODIMENT

Figure 4:
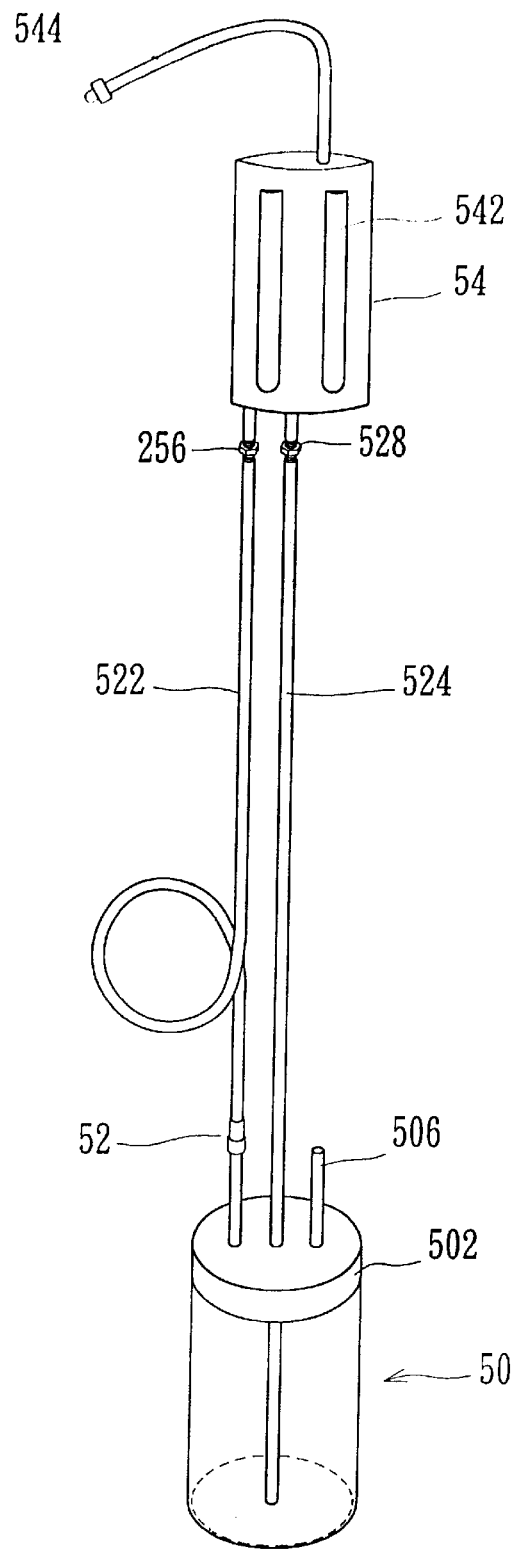
FIG. 4 is a perspective view of a prototype of the present view.

First, referring to FIG. 4 and Attachment 1. They show the original prototype diagram and the profile view of the preferred embodiment of the present invention; as the figures shown, it's bottom is a hollow container 50, and a cover 502 is installed at the upper side, a plurality of through holes disposed at the cover 502 are utilized for gas deliverance, gas inhalation and gas exhalation; besides, a check valve is connected to a delivering tube 522, the delivering tube 522 is fixed to a thermostatic box 54 by a nut 526, a inhaling tube 524 beside the delivering tube 522 is fixed by a nut 528, the inhaling tube 524 is extended downwards to the bottom of the container 50; two heating tubes 542 installed at the two flank sides of the thermostatic box 54 are adapted to let heating devices be inserted in them, a conduit is installed at the upper side of the box for inhaling air. At the beginning of the implementation, input light oil to the container 50 first, let air be inhaled through the conduit 544, then close the conduit 544, meanwhile, insert the heating device into the heating tubes 542 to keep the thermostatic box 54 at constant temperature, consequently, the heating air is guided into the bottom of the container 50 through the inhaling tube 524 and then output from a exhaling opening 506 for future use, and excessive gas is guided into the thermostatic box 54 through the check valve 52 and the delivering tube 522, this cycle is followed while the light oil vapor is evaporating.

Figure 1:
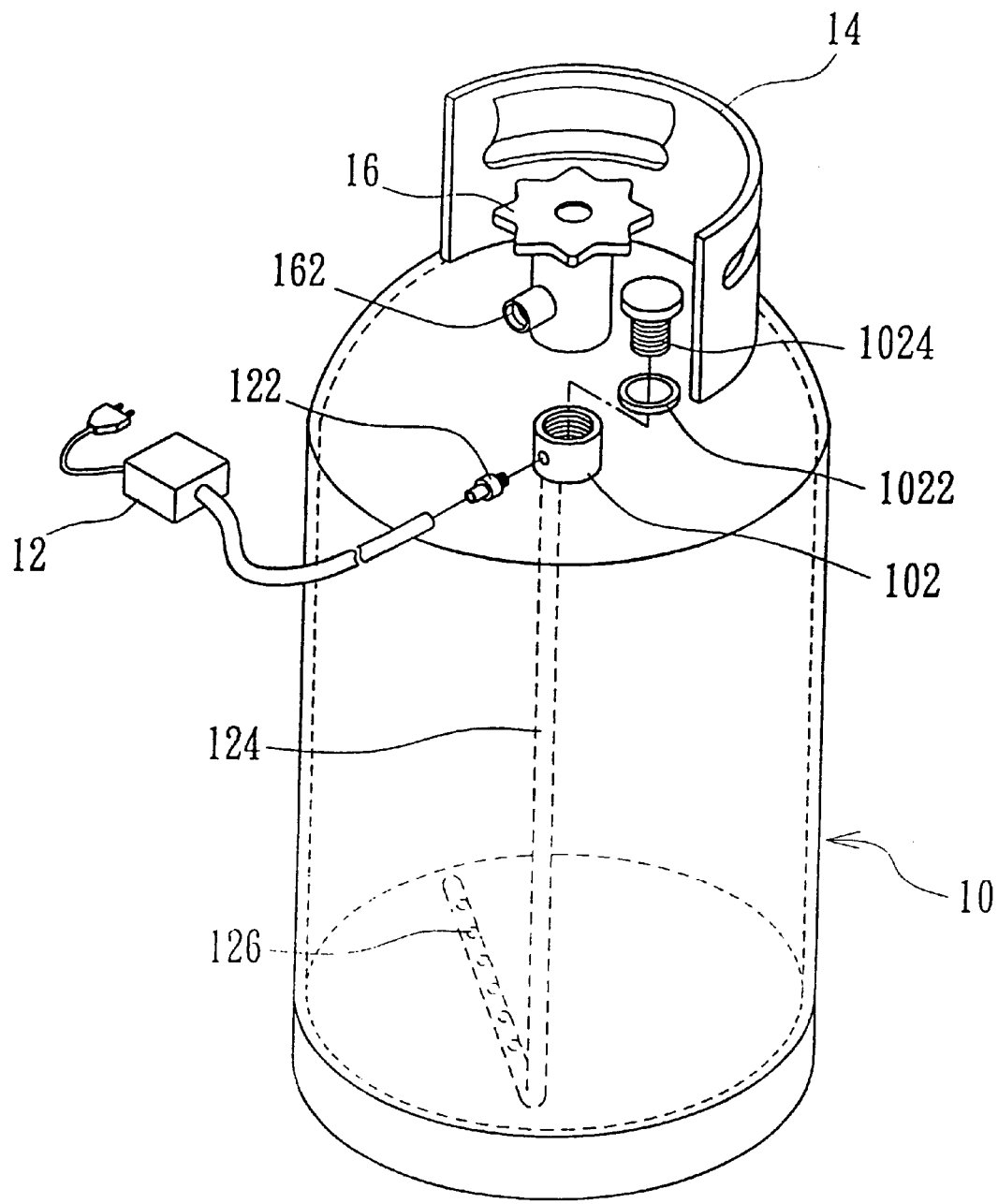
FIG. 1 is a perspective view of the conventional light oil steel bottle.
Figure 2:
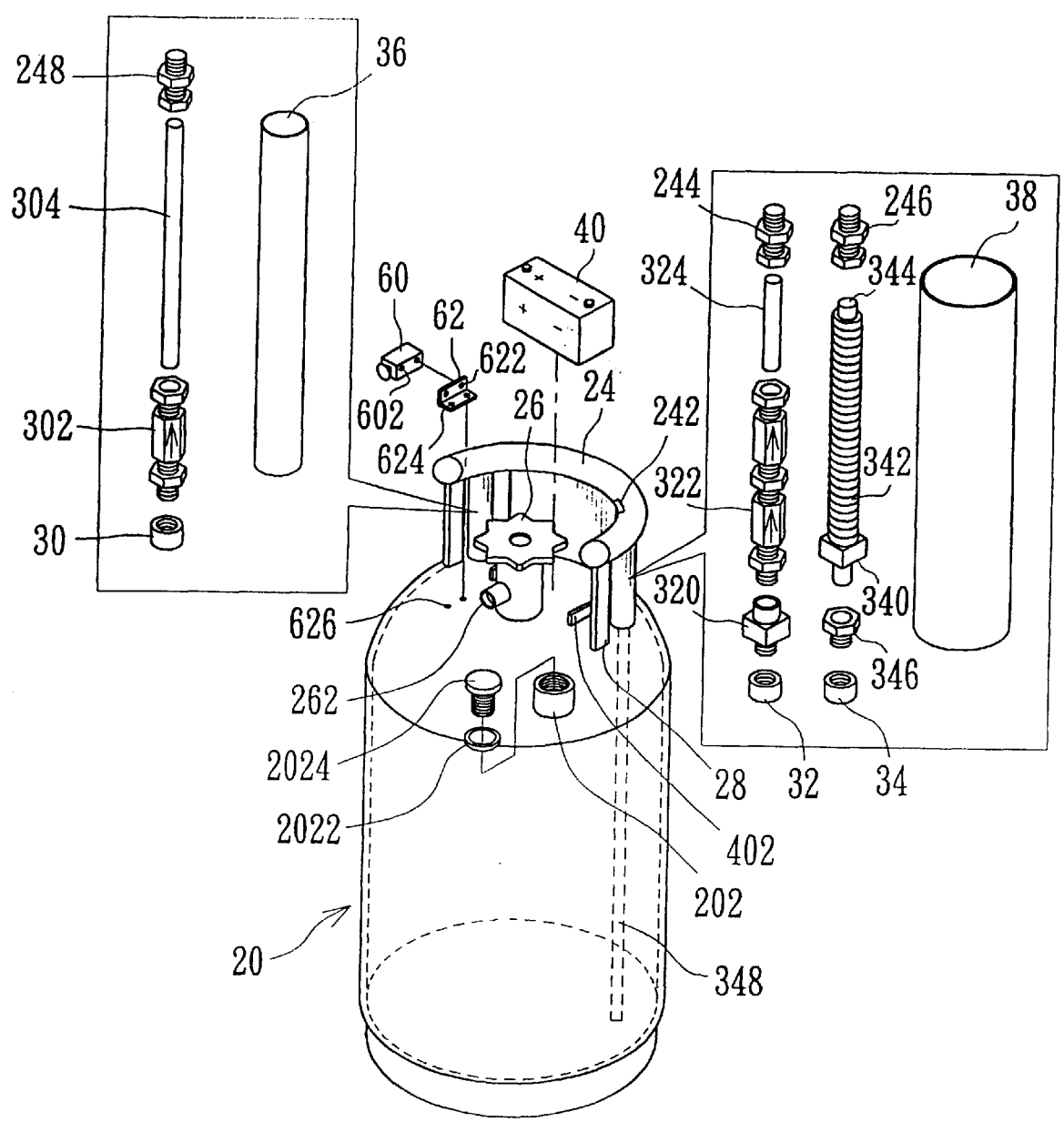
FIG. 2 is an explosive view of a preferred embodiment of the present invention.

FIG. 2 is an explosive view of a preferred embodiment of the present invention; as the figure shown, it's main structure comprises: a barrel body 20 which an oil input opening 202 is disposed at upper side thereof, a set of battery holding brackets 402, a plurality of screw holes 626, supports 28, an air supplying device which includes a rotating switch 26 and air supplying openings 262; a warning device, includes a level buzzer 60 and a L-type frame 62, a plurality of screw holes 602 are disposed at one side of the level buzzer 60, and a plurality of through holes 622 are disposed at one surface of the L-type frame 62, a plurality of through holes 624 are disposed at another surface thereof, enabling screws to pass through them and be screwed in the screw holes 626; a power supply, fixed on the top side of the barrel body 20 through the battery holding brackets 402, is a battery 40; a pressure stabilizer is a pressure stabilizing tube 24, a pressure switch 242 can detect pressure values is installed in the tube 24, the tube 24 is connected to the barrel body 20 through the supports 28; a thermostatic device includes a rheostatic-control air motor 320, a soft resistance wire 342, check valves 302 and 322, a temperature-control relay 340, air delivering tubes 304 and 324, an inhaling tube 344, thermostatic cottons 36 and 38 and is fixed between the barrel body 20 and the pressure stabilizing tube 24 by screw holes 30, 32 and 34 as well as screw caps 248, 244 and 248; a washer 2022 and a cover 2024 is installed on the oil input opening 202; in addition to these, a polymer venturi tube is disposed at another end of the inhaling tube which is symmetric to the barrel body 20.

Figure 3:
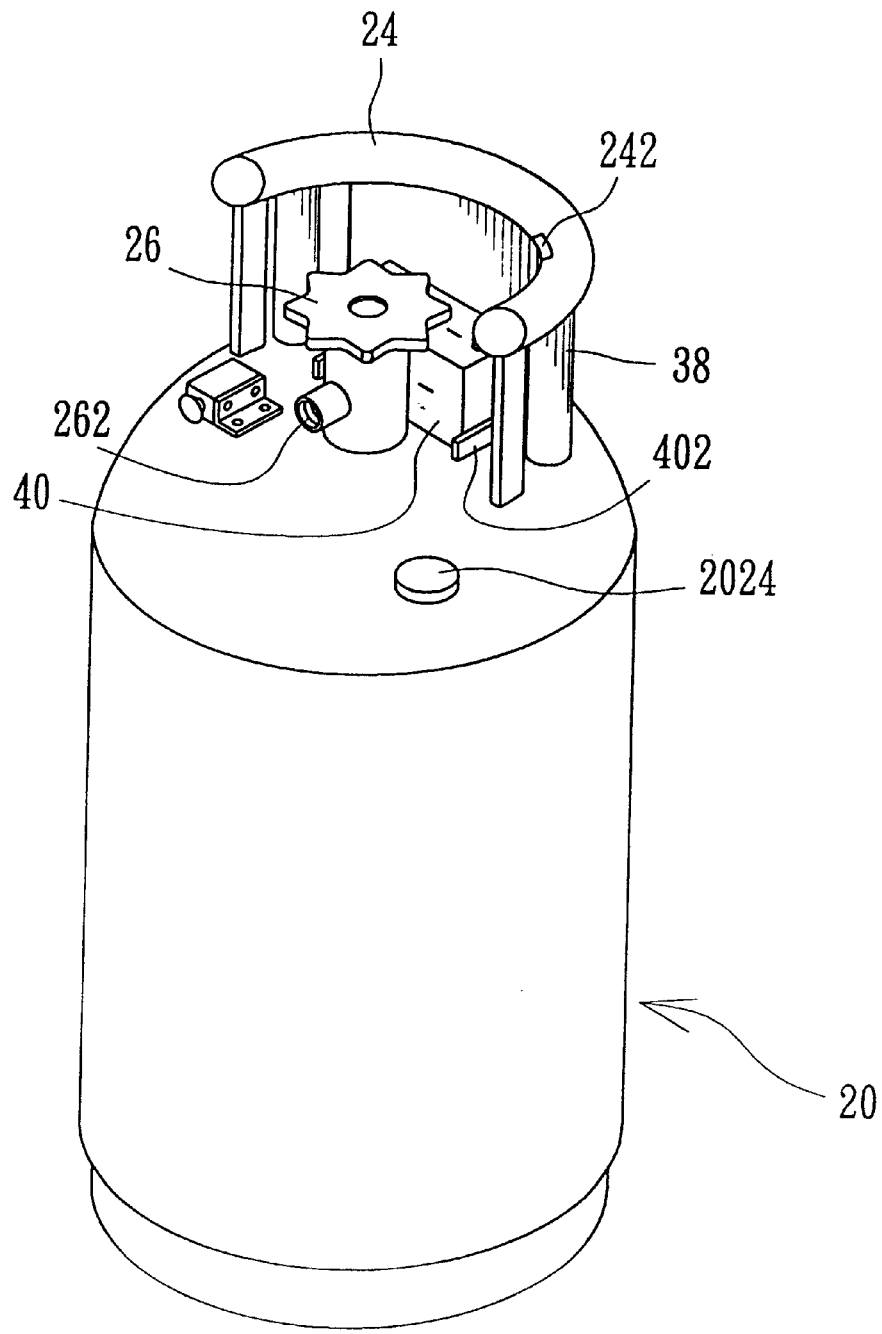
FIG. 3 is an outside profile view of a preferred embodiment of the present invention.

As shown in FIG. 3, open the cover 2024 first, add light oil into the barrel body 20 through the oil input opening 202, connect the battery 40 to the barrel body, at this time, pressure insufficiency is detected by the pressure switch 242 on the pressure stabilizing tube 24, the rheostatic-control air motor 320 is then driven to start to pump air, the air is pumped into the pressure stabilizing tube 24 through the check valve 322 and the air delivering tube 324; the soft resistance wire is started to heat at the same time until the temperature-control relay is opened due to the too high temperature, but when the temperature is lowered, the soft resistance wire start to heat so as to keep the temperature constant; when the pressure in the pressure stabilizing tube 24 reaches to a specific extent, the air is delivered into the light oil through the inhaling tube 344 and the polymeric venturi tube connected thereto to adjust the saturated vapor pressure of the oil vapor; when the rheostatic-control air motor 320 is driven, if the pressure is high enough and unable to inhale air, it's resistance will be increased, but the resistance reaches to an extent, the rheostatic-control air motor 320 will automatically be stopped; the auxiliary check valve 302 and air delivering tube 304 are used to help to maintain the pressure constant. Further, the level buzzer 60 is installed, the flank side thereof is fixed to the screw holes 602 by the way that screws are passed through the through holes 622 on the L-type frame 62, then the frame 62 is fixed to the screw holes 626 on the barrel body 20 by the way that screws are passed through the through holes 624 on the L-type frame 62; when the barrel body 20 is rocked or tilted over 45°, the level buzzer 60 sounds a warning signal right way.

What is claimed is:

1. A control equipment for keeping light oil vapor at stable pressure and constant temperature mainly comprising:

a barrel body, the inner side thereof being a container, an oil input and a plurality of screw holes being disposed at the upper side of the barrel body and an air supplying tube extended to the bottom of the container being installed at the one of screw holes;

a pressure stabilizer, a pressure switch being installed therein for controlling an air-pumping device so as to balance pressure;

a check valve, being connected between said barrel body and said pressure stabilizing tube to prevent air from flowing back;

a soft resistance wire, being controlled by a temperature-controlled relay and being winded around an inhaling tube, wherein said inhaling tube is connected to said air supplying tube; and a battery, being fixed at the upper side of said barrel body through battery holding brackets for supplying needed electric power.

2. The equipment of claim 1, wherein said air pumping device is a rheostatic-control air motor.

3. The equipment of claim 1, wherein said air supplying tube is polymeric venturi tube.

4. The equipment of claim 1, wherein said check valve can be connected between said air pumping device and said pressure stabilizing tube.

5. The equipment of claim 1, wherein said battery is the one of direct current and 12 volts.

6. The equipment of claim 1, wherein thermostatic cotton is covered outside said soft resistance wire to lower the speed of heat loss.

7. The equipment of claim 1, wherein a buzzer is fixed on said barrel body.

8. The equipment of claim 7, wherein said buzzer is a level buzzer.

* * * * *